United States Patent
Park et al.

(10) Patent No.: US 7,899,074 B2
(45) Date of Patent: Mar. 1, 2011

(54) APPARATUS AND METHOD FOR CONTROLLING MULTI-CHANNEL ACCESS

(75) Inventors: Tae Joon Park, Dejeon (KR); Se Han Kim, Dejeon (KR); Nae-Soo Kim, Daejeon (KR); Cheol Sig Pyo, Daejeon (KR); Jae Yong Lee, Daejeon (KR); Byung Chul Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 212 days.

(21) Appl. No.: 12/153,704

(22) Filed: May 22, 2008

(65) Prior Publication Data

US 2009/0154485 A1     Jun. 18, 2009

(30) Foreign Application Priority Data

Dec. 18, 2007    (KR) .................... 10-2007-0133744

(51) Int. Cl.
     *H04L 12/40*      (2006.01)
(52) U.S. Cl. ............... 370/438; 370/310; 370/345; 370/347; 370/348; 370/431; 370/439
(58) Field of Classification Search ........... 370/310, 370/345, 347, 348, 431, 438, 439; 455/403, 455/422.1, 455, 39, 500, 501, 515, 516
See application file for complete search history.

(56) References Cited

U.S. PATENT DOCUMENTS

| | | | |
|---|---|---|---|
| 2003/0152041 A1* | 8/2003 | Herrmann et al. ........... | 370/310 |
| 2006/0062181 A1* | 3/2006 | Chou .......................... | 370/329 |
| 2007/0230338 A1* | 10/2007 | Shao et al. .................. | 370/230 |
| 2008/0012754 A1* | 1/2008 | Gao ............................ | 342/194 |
| 2008/0031172 A1* | 2/2008 | Nanda et al. .............. | 370/310.1 |
| 2008/0084835 A1* | 4/2008 | Goel et al. ................... | 370/310 |
| 2008/0248799 A1* | 10/2008 | Choi ........................ | 455/426.1 |

FOREIGN PATENT DOCUMENTS

KR     10-779105     11/2007

(Continued)

OTHER PUBLICATIONS

Ozlem Durmaz Incel et al., "Multi-channel Support for Dense Wireless Sensor Networking", EUROSSC 2006, Oct. 25-27, 2006, LNCS 4272, 14 pages, 2006.

(Continued)

*Primary Examiner*—William Trost, IV
*Assistant Examiner*—Charles C Jiang
(74) *Attorney, Agent, or Firm*—Staas & Halsey LLP

(57) ABSTRACT

Provided is an apparatus and method for controlling multi-channel access in USN-based MAC. The multi-channel access control apparatus includes a channel scanner, a control channel preoccupier, and an available channel exchanger. The channel scanner scans at least one or more available channels among the N data channels in a Tx sensor node. The control channel preoccupier preoccupies, in the Tx sensor node, the control channel through control channel sensing and back-off and broadcasts a preamble on the control channel periodically. The available channel exchanger detects, in an Rx sensor node, the available channels available to the Tx sensor node on the basis of the received preamble, selects a channel available to the Rx sensor node among the detected available channels, and transmits information about the selected channel to the Tx sensor node.

4 Claims, 5 Drawing Sheets

FOREIGN PATENT DOCUMENTS

| KR | 10-2008-0050963 | 6/2008 |
| KR | 10-2007-0069458 | 7/2008 |
| KR | 10-2008-0072783 | 8/2008 |

OTHER PUBLICATIONS

Gang Zhou et al., "MMSN: Multi-Frequency Media Access Control for Wireless Sensor Networks", Apr. 23-29, 2006, 13 pages.

Chen Xun et al., "A Multi-Channel MAC Protocol for Wireless Sensor Networks", The Sixth IEEE International Conference on Computer and Information Technology (CIT'06), 2006 IEEE, Apr. 20-22, 2006, 6 pages.

Kaushik R. Chowdhury et al., "CMAC-A Multi Channel Energy Efficient MAC for Wireless Sensor Networks," 2006 IEEE, Apr. 3-6, 2006, pp. 1172-1177.

* cited by examiner

FIG. 3

| Packet Length | Type=1 | Sender ID | Receiver ID | Total Ch. Number | Availble Ch# | Availble Ch# | .... | CRC |

310 — Sender ID
320 — Receiver ID

FIG. 4

| Packet Length | Type=2 | Sender ID | Receiver ID | Availble Ch# | .... | CRC |

410 — Sender ID
420 — Receiver ID

APPARATUS AND METHOD FOR CONTROLLING MULTI-CHANNEL ACCESS

CROSS-REFERENCE TO RELATED PATENT APPLICATION

This application claims the benefit of Korean Patent Application No. 10-2007-0133744, filed on Dec. 18, 2007, in the Korean Intellectual Property Office, the disclosure of which is incorporated herein in its entirety by reference.

BACKGROUND OF THE INVENTION

1. Field of the Invention

The present invention relates to Media Access Control (MAC) based on a Ubiquitous Sensor Network (USN), and more particularly, to an apparatus and method for controlling multi-channel access in USN-based MAC.

The present invention is derived from a research project supported by the Information Technology (IT) Research & Development (R&D) program of the Ministry of Information and Communication (MIC) and the Institute for Information Technology Advancement (IITA) [2005-S-106-03, Development of Sensor Tag and Sensor Node Techniques for RFID/USN].

2. Description of the Related Art

USN-based MAC technologies aim at increasing the reliability of a network and increasing the lifetime of the network by reducing energy consumption. To this end, it is important to develop multi-channel MAC technologies capable of supporting multi-channel access of sensor nodes.

The use of multi-channel access can provide a reliability increase and a power consumption reduction resulting from a decrease in collision-caused loss, thus making it possible to increase the lifetime of a USN network and satisfy Quality of Service (QoS) requirements. Therefore, a multiple access scheme can be said to be very important.

Because multi-channel wireless sensor networks have small hardware sensors operated by small batteries, they have important differences from general multi-channel wireless networks.

A general sensor node radio-frequency (RF) module uses a single half-duplex radio transceiver. Thus, the sensor node RF module is inferior in hardware capability to applications used in general wireless ad-hoc environments. In general, one sensor node RF module is used because the sensor node is small.

Also, in general, a sensor node in a wireless sensor network uses a battery, which is difficult to replace by a new one, as a power source. Therefore, the sensor node cannot continue to maintain a receiving mode due to a limited power and thus uses a power-saving design that alternates between a sleep mode and a listening mode.

The main object of using a multi-channel wireless sensor network in the sensor network having such hardware limitations is to provide a power gain by minimizing retransmission that may be caused by a short latency and, in many cases, a collision.

Sensor networks can be used to monitor surrounding environments or natural environments that may have urgent situations such as forest fires, emergent patients, and traffic accidents. There is a case where a plurality of sensor nodes simultaneously transmit data to a sink node in the monitoring process. In this case, when only a single channel is used, the use of a contention-based MAC protocol may cause a failure in data transmission due to a severe contention or an increase in power loss due to retransmission. On the other hand, the use of a noncontention-based MAC protocol can provide a considerable latency but requires a constant amount of energy consumption for the considerable latency even in the normal mode.

Thus, unlike a multi-channel wireless access control scheme for a general wireless network, a multi-channel wireless access control scheme for a wireless sensor network must give special consideration to the limited battery lifetime and the QoS for urgent situations.

SUMMARY OF THE INVENTION

The present invention uses a channel scanning operation to prevent a channel loss and retransmission in a multi-channel wireless network using a plurality of channels, thereby increasing the energy efficiency.

Also, in a multi-channel wireless network using a plurality of channels, the present invention uses one of the channels as a channel negotiation channel and prevents a channel loss and retransmission, which may be caused by a collision, by using a channel scanning operation.

According to an aspect of the present invention, there is provided an apparatus for controlling access to multiple channels including a control channel and N data channels, the apparatus including: a channel scanner scanning at least one or more available channels among the N data channels in a Tx sensor node; a control channel preoccupier preoccupying, in the Tx sensor node, the control channel through control channel sensing and back-off and broadcasting a preamble on the control channel periodically; and an available channel exchanger detecting, in an Rx sensor node, the available channels available to the Tx sensor node on the basis of the received preamble, selecting a channel available to the Rx sensor node among the detected available channels, and transmitting information about the selected channel to the Tx sensor node.

According to another aspect of the present invention, there is provided a method of controlling access to multiple channels including a control channel and N data channels in a wireless sensor network system, the method including: scanning at least one or more available channels among the N data channels, by a Tx sensor node; preoccupying the control channel through control channel sensing and back-off and broadcasting a preamble on the control channel periodically, by the Tx sensor node; and detecting the available channels available to the Tx sensor node on the basis of the received preamble, selecting a channel available to the Rx sensor node among the detected available channels, and transmitting information about the selected channel to the Tx sensor node, by an Rx sensor node.

BRIEF DESCRIPTION OF THE DRAWINGS

The above and other features and advantages of the present invention will become more apparent by describing in detail exemplary embodiments thereof with reference to the attached drawings in which:

FIG. 3 illustrates a format of a preamble according to an embodiment of the present invention;

FIG. 4 illustrates a format of an Ack message transmitted from an Rx sensor node to a Tx sensor node according to an embodiment of the present invention;

DETAILED DESCRIPTION OF THE INVENTION

Figure 1:
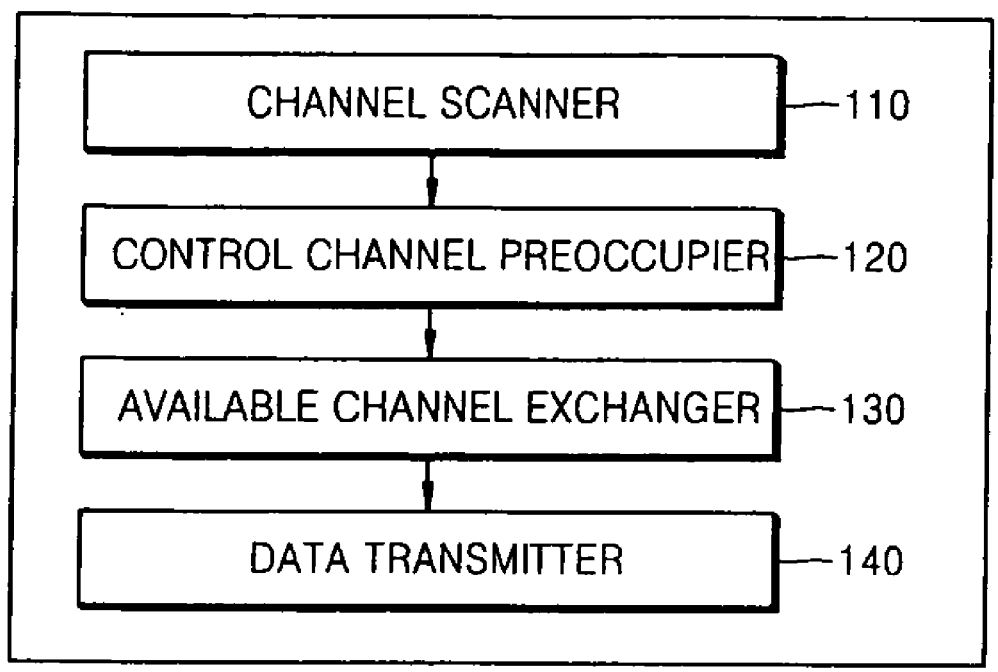
FIG. 1 is a block diagram of a multi-channel access control apparatus according to an embodiment of the present invention.

The present invention will now be described more fully with reference to the accompanying drawings, in which exemplary embodiments of the invention are shown. Like reference numerals in the drawings denote like elements, and thus their detailed description will be omitted for conciseness.

In the following description of the embodiments of the present invention, detailed descriptions about well-known functions and configurations incorporated herein will be omitted if they are deemed to obscure the subject matter of the present invention.

Also, the invention may be embodied in many different forms and should not be construed as being limited to the embodiments set forth herein; rather, these embodiments are provided so that this disclosure will be thorough and complete, and will fully convey the concept of the invention to those skilled in the art.

When (N+1) multiple channels are used in a wireless sensor network of the present invention, one of the channels is used as a control channel for performing channel negotiation between sensor nodes and the other N channels are used as data channel for data transmission.

Also, each of the sensor nodes in the wireless sensor network sets the channel of a transceiver to a specific data channel only in a data Tx/Rx mode. On the other hand, when the current mode is not a data Tx/Rx mode, the sensor node sets the channel of the transceiver to a control channel and waits to receive data.

Also, each of the sensor nodes has a predetermined sleep period and a predetermined wake-up period. In the wake-up period, the sensor node listens a control channel to determine whether there is a node that is to transmit data to the sensor node itself.

Figure 2:
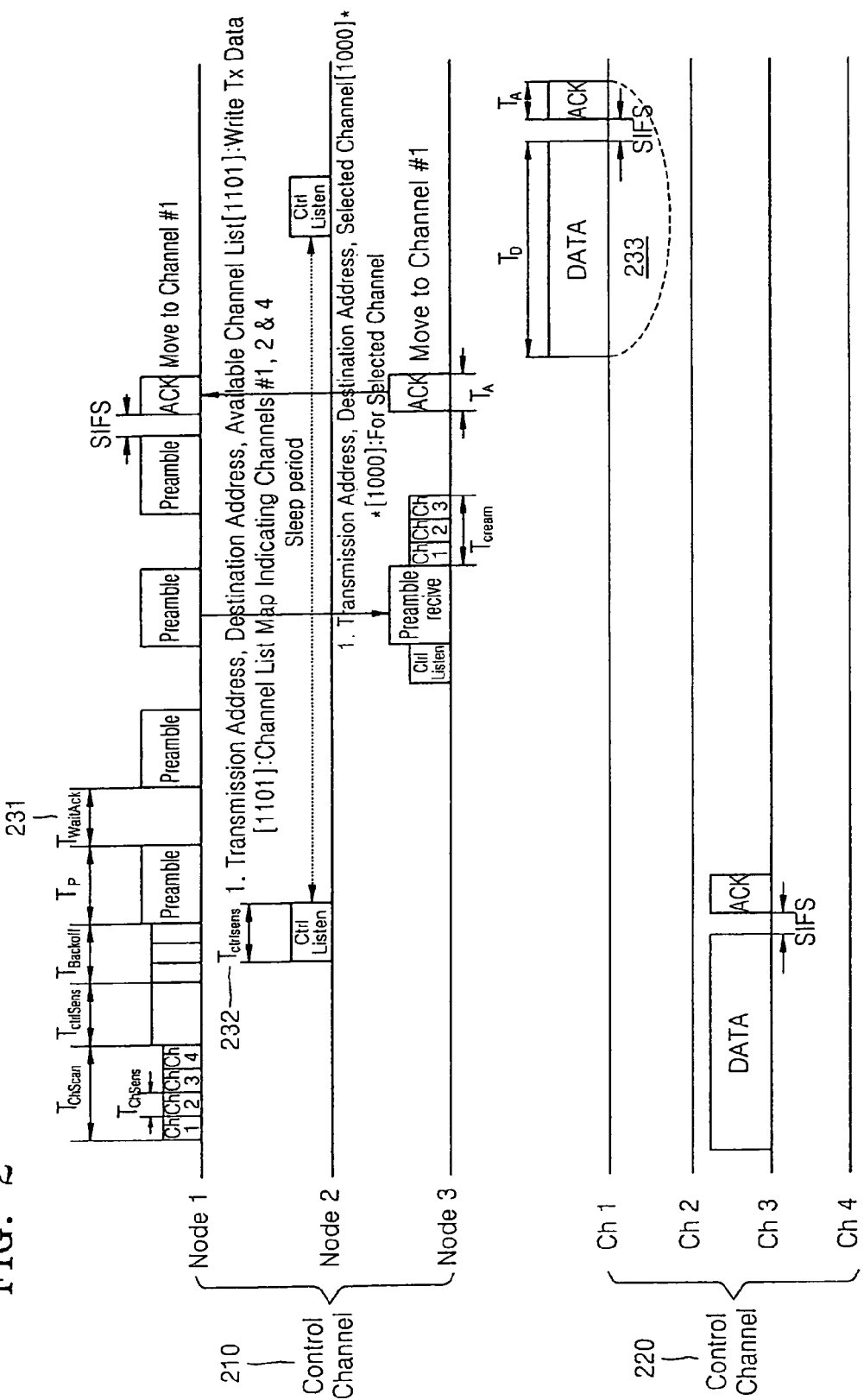
FIG. 2 illustrates an overall process of a multi-channel wireless access control method using a channel scanning operation according to an embodiment of the present invention.

FIG. 1 is a block diagram of a multi-channel access control apparatus according to an embodiment of the present invention. FIG. 2 illustrates an overall process of a multi-channel wireless access control method using a channel scanning operation according to an embodiment of the present invention.

A multi-channel access control apparatus of the present invention uses a multi-channel wireless access control method using a channel scanning operation. A transmitting (Tx) sensor node detects the current states of data channels. If there is an available channel, a receiving (Rx) sensor node selects a communication channel based on the detection results of the Tx sensor node.

Referring to FIG. 1, the multi-channel access control apparatus includes a channel scanner 1 10, a control channel preoccupier 120, an available channel exchanger 130, and a data transmitter 140. Hereinafter, the subject matter of the present invention will be described with reference to FIGS. 1 and 2.

The channel scanner 110 scans at least one or more available channels among the data channels that are available to the Tx sensor node in a wireless sensor network system. The Tx sensor node desiring to transmit data performs a channel scanning operation, and then returns to a control channel.

The control channel preoccupier 120 preoccupies the control channel through control channel sensing and back-off, and then broadcasts a preamble on the control channel periodically.

If there are a plurality of Tx nodes, a collision may occurs in a control channel. In order to preoccupy a control channel between Tx sensor nodes, the control channel is sensed as follows:

Control Channel Sensing

First, criterions for detection of the current state of a control channel are as follows: A Tx sensor node does not transmit any data for a time period of $T_{WaitAck}$ 231 during a preamble Tx period. The $T_{WaitAck}$ 231 is a time period while the Tx sensor node waits to receive an Ack message from the transmission of the current preamble to the transmission of the next preamble. That is, because transmission of a preamble means data transmission, the Tx sensor node waits to receive an Ack message (i.e., reception confirmation information) from the transmission of the current data to the transmission of the next data.

Not transmitting any data for the $T_{WaitAck}$ 231 means that, when a new node participates, another node waits to receive an Ack message after the transmission of data in order not to misinterpret the silence of a channel as the emptiness of the channel.

Therefore, if a corresponding Rx sensor node does not transmit an ACK message, it means that no data is transmitted in a control channel although the control channel is used during this time period.

Thus, because another Tx sensor node desiring to preoccupy a control channel must sense the control channel during a sufficient time period longer than the above time period, a time period of $T_{CtrlSense}$ 232 for determination of the state of the control channel is defined as Equation (1):

$$T_{CtrlSense}(232) = T_{WaitAck}(231) + T_{CCA} \qquad (1)$$

In Equation (1), $T_{CCA}$ denotes a clear channel assessment (CCA) time for a transceiver. The $T_{CCA}$ is a period of time taken for the transceiver to determine whether there is meaningful non-noise data in the corresponding channel. The $T_{CCA}$ is determined according to a bit rate (B) and may be expressed as $T_{CCA}=1/B$. For example, because a transmission data rate, i.e., the energy efficiency of a CC2500 transceiver is 250 Kbps, the $T_{CCA}$ for determination of 1 bit of the meaningful data is 1/250 Kbps=4 μsec.

All the nodes wake up according to a duty cycle, and sense a control channel during a wake-up period. In this case, a wake-up period for nodes to receive a preamble is also $T_{CtrlSense}$ 232.

If a control channel is not in use during the $T_{CtrlSense}$ 232, a Tx sensor node preoccupies the control channel. However, a back-off operation identical to the back-off of IEEE 802.11 DCF is performed to prevent a collision between nodes sensing a control channel during the same time period.

The available channel exchanger 130 detects a channel available to an Rx sensor node from a channel list scanned by the channel scanner 110, and transmits information about the channel available to the Rx sensor node to the Tx sensor node together with an Ack message.

If the control channel is preoccupied by the Tx sensor node, the Tx sensor node performs channel negotiation with the Rx sensor node in the control channel on the basis of the channel list selected by the channel scanner 110 through the channel scanning operation.

That is, the Rx sensor node detects data channels available to the Tx sensor node on the basis of the received preamble, selects a channel available to the Rx sensor node among the detected data channels, and transmits information about the selected channel to the Tx sensor node together with an Ack message. In this way, the Rx sensor node and the Tx sensor node succeeding in the channel negotiation on the control channel preoccupy one data channel.

The time for a pair of the Tx sensor node and the Rx sensor node to preoccupy the data channel is the time to transmit data and receive a corresponding ACK message. This time 233 corresponds to $(T_D+SIFS+T_A)$ as illustrated in FIG. 2.

Herein, $T_D$ denotes the data transmission time for the Tx sensor node, $T_A$ denotes the ACK message transmission time for the Rx sensor node, and SIFS denotes the time for the Tx sensor node/the Rx sensor node to change its transceiver from an Rx/Tx mode into a Tx/RX mode.

Data transmission is not performed on the data channel during the time SIFS among these times, and the corresponding channel seems to be not in use. Therefore, nodes scanning a data channel for data transmission must scan a data channel during a sufficient time period longer than the time SIFS. Thus, the time $T_{ChSense}$ to scan one data channel is defined as Equation (2):

$$T_{ChSense}=SIFS+T_{CCA} \quad (2)$$

Assuming that the time taken to determine the state of each data channel is $T_{ChSense}$, the time taken to change the channel of a transceiver is $T_{FreqHopping}$, and the number of data channels except the control channel in the network is N. In this case, the total time $T_{ChScan}$ taken to scan the data channels can be defined as Equation (3):

$$T_{ChScan}=(T_{ChSense}+T_{FreqHopping})\times N \quad (3)$$

The Tx sensor node scans a data channel during the above time period, selects an n number of available channels, and transmits information about the selected channels to the Rx sensor node through a preamble on the control channel. Each Rx sensor node detects a channel list in the preamble during the above time $T_{ChSense}$ upon receipt of the preamble from the Tx sensor node, and the channel scanning time for the Rx sensor node is equal to $T_{ChScan}$ (N=n).

The data transmitter 140 changes the channel of the Rx sensor node into the channel selected by the Rx sensor node in order to transmit data.

FIG. 3 illustrates a format of a preamble according to an embodiment of the present invention.

A data channel is determined using a preamble as follows: A Tx sensor node transmits a preamble through a control channel for data transmission.

If the preamble transmitted by the Tx sensor node ends in a sleep period of an Rx sensor node, the Rx sensor node cannot receive the preamble transmitted by the Tx sensor node. Thus, the transmission duration time must be a sufficient time period longer than one sleep period so that the Rx sensor node can detect the preamble.

Referring to FIG. 3, a preamble message includes information about Packet_Length, Type, Sender_ID (310), Receiver_ID (320), Available_Ch_List (Available_Ch_Total#, Available_Ch# ... ), and CRC. Packet_Length is the length of the message, Type is the type of the message (Type=1), Sender_ID (310) is an ID of a TX sensor node, Receiver_ID (320) is an ID of a destination node that the Tx sensor node desires to communicate with, and Available_Ch_List is the list of an (N=n) number of available data channels selected through a data channel scanning operation, which is the list of the corresponding channel numbers allocated except the total number and 0.

The Tx sensor node periodically transmits a preamble including information as illustrated in FIG. 3. An interval as much as the time $T_{WaitAck}$, which is to receive an ACK message from the Rx sensor node, exists between the respective preambles.

If the time taken to transmit an ACK message is $T_A$, the time $T_{WaitAck}$ to received the ACK message is defined as Equation (4):

$$T_{WaitAck}=SIFS+T_A \quad (4)$$

FIG. 4 illustrates a format of an Ack message transmitted from an RX sensor node to a TX sensor node according to an embodiment of the present invention.

Referring to FIG. 4, an Ack message includes information about Packet_Length, Type, Sender_ID (410), Receiver_ID (420), Available_Ch_List (Available_Ch_Total#, Available_Ch# ... ), and CRC. Packet_Length is the length of the message, Type is the type of the message (Type=2), Sender_ID (410) is an ID of a TX sensor node, Receiver_ID (420) is an ID of an RX sensor node, and Available_Ch_List is the list of an (N=n) number of available data channels selected through a data channel scanning operation, which is the list of the corresponding channel numbers allocated except the total number and 0.

Figure 5:
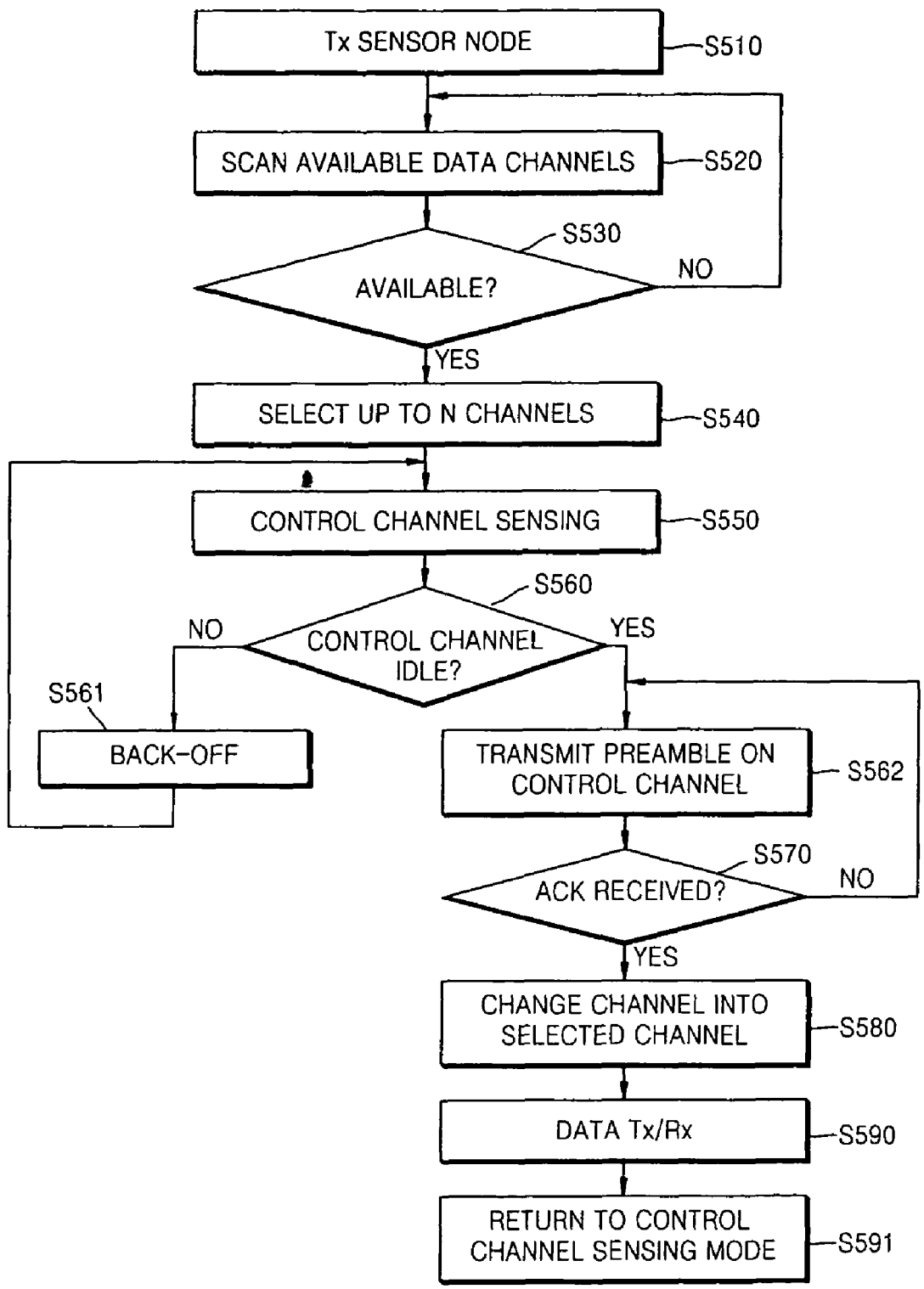
FIG. 5 is a flow diagram illustrating a multi-channel wireless access control method using a channel scanning operation according to an embodiment of the present invention.

FIG. 5 is a flow diagram illustrating a multi-channel wireless access control method using a channel scanning operation according to an embodiment of the present invention.

Referring to FIG. 5, a Tx sensor node scans idle data channels for data transmission to select an up to n number of available data channels (data channel scanning) (S510~S540). Herein, multiple channels are a total of (N+1) channels, and one of the channels is used as a control channel.

Thereafter, in order to prevent a collision in the control channel, the Tx sensor node performs control channel sensing and back-off (S550, S560, and S561). The Tx sensor node preoccupying the control channel periodically broadcasts a preamble, including information about an RX sensor node and information for transmission of data such as the selected channel, on the control channel (S562).

In a wireless sensor network system, each node except the Tx sensor node wakes up in its wake-up period to receive the preamble transmitted by the Tx sensor node (S562). Upon receipt of the preamble, the node detects information in the preamble to determine whether the node itself is a node to which the Tx sensor node is to transmit data. If the node itself is not the node to which the Tx sensor node is to transmit data, it returns to a sleep period.

On the other hand, if the node itself is the node to which the Tx sensor node is to transmit data, the Rx sensor node detects the availability of data channels, which are selected by the Tx sensor node for data transmission together with the preamble, to select one available data channel, transmits information about the selected data channel to the Tx sensor node through an ACK message, and changes the channel of a transceiver into the selected data channel (S570 and S580). Upon receipt of the ACK message from the Rx sensor node, the Tx sensor node changes its channel into a channel in the ACK message to start data transmission (S590). Upon completion of the data transmission, the Tx sensor node returns to a control channel sensing mode (S591).

Figure 6:
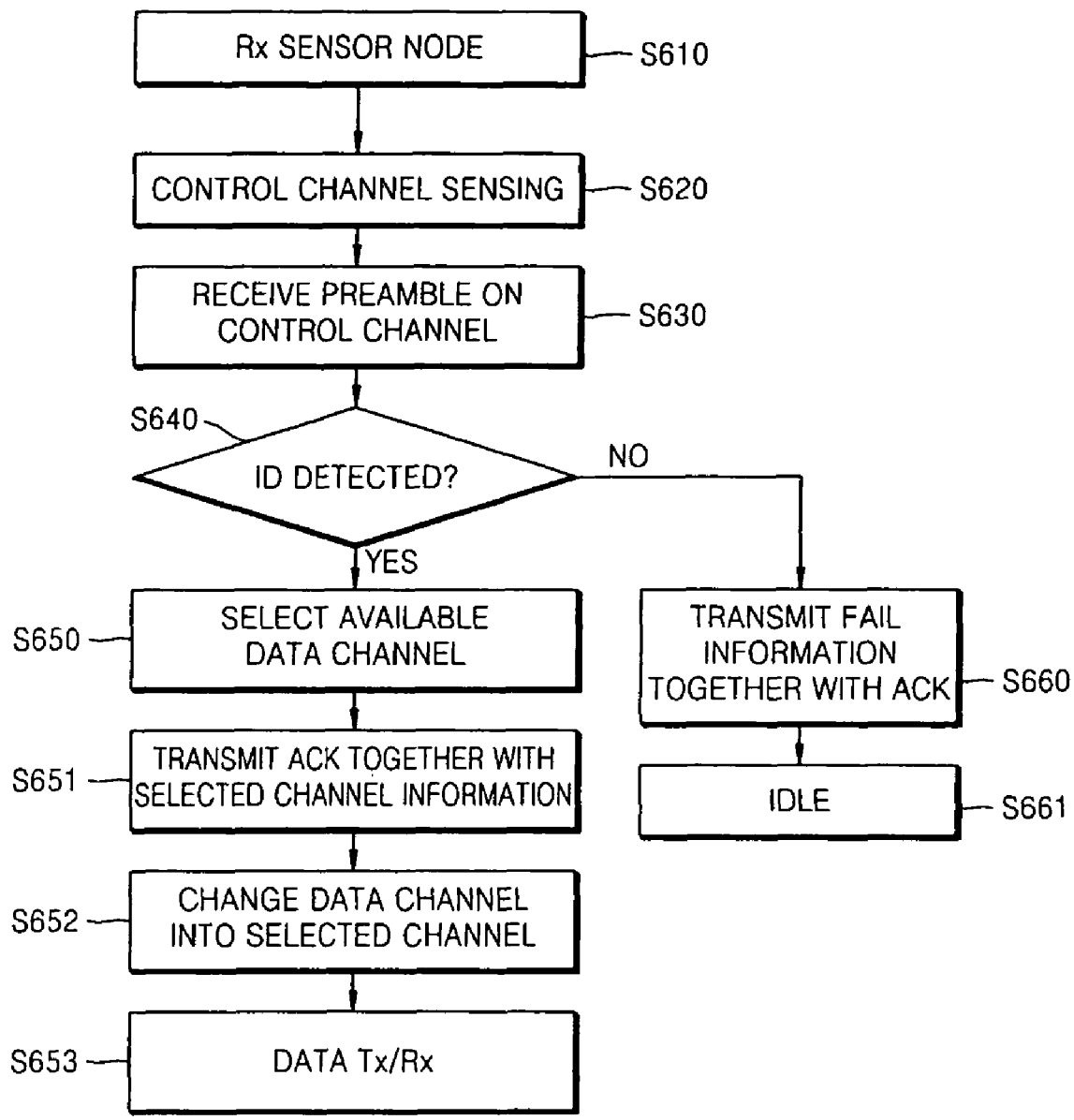
FIG. 6 is a flow diagram illustrating multi-channel wireless access control for an Rx sensor node according to an embodiment of the present invention.

FIG. 6 is a flow diagram illustrating multi-channel wireless access control for an RX sensor node according to an embodiment of the present invention.

Referring to FIG. 6, when a Tx sensor node performs a control channel sensing operation (S620), the Tx sensor node transmits a preamble and preoccupies a control channel if the control channel is not in use during the time $T_{CtrlSense}$ (232) of Equation (1).

In a wake-up period, an Rx sensor node receives a preamble that is transmitted on a control channel by the Tx sensor node that has sensed the control channel (S630). Upon receipt of the preamble, based on an RX sensor node address included in the preamble, the Rx sensor node determines whether the Rx sensor node itself is a node to which the Tx sensor node is to transmit data (S640). If the Rx sensor node itself is not the node to which the Tx sensor node is to transmit data, it enters a sleep period according to its duty cycle.

On the other hand, if the Rx sensor node itself is the node to which the Tx sensor node is to transmit data, it selects a data channel available to itself among available data channels transmitted from the Tx sensor node (S650). The object of channel scanning in the Rx sensor node is to prevent the problem of a hidden terminal that is included in the transmission range of the Rx sensor node while not being included in the transmission range of the Tx sensor node.

Thereafter, the Rx sensor node transmits information about the selected data channel and an Ack message to the Tx sensor node in the period $T_{WaitAck}$ between preambles (S651). In case of normal allocation, the Rx sensor node transmits an ACK message and changes its channel into a corresponding data channel. Upon receipt of the ACK message from the Rx sensor node, the Tx sensor node also changes its channel into a channel in the received ACK message (S652 and S653).

Upon receipt of an Ack message, the Tx sensor node converts its data channel into a selected channel and then transmits/receives data.

Thereafter, if an ID (320) in the preamble is different from an ID of the Rx sensor node, the Rx sensor node transmits an Ack message and Fail information indicating an unsuitable Rx sensor node to the Tx sensor node, and then returns to an idled mode (S660 and S661). At this point, if a channel number is transmitted as an unused number 0, it is regarded as being a failure in channel allocation.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, unlike the conventional wireless access control method using a single channel, the multi-channel wireless access control method using a channel scanning operation according to the present invention detects a control channel using only the wake-up period when the current mode is not a data Tx/Rx mode, and transmits/receives data using an available data channel when the current mode is a data Tx/Rx mode. Therefore, the present invention increases the probability of immediate transmission to minimize a loss caused by a delay and a collision. Thus, the present invention can enhance the transmission quality and reduce power consumption caused by retransmission.

Also, in the multi-channel wireless access control method using the channel scanning operation, because a node desiring data transmission detects an available channel using a channel scanning operation, the node need not continue to retain the use sate of each channel. That is, the Rx sensor node selects an available channel by scanning a channel list received from the Tx sensor node, and transmits information about the selected channel to the Tx sensor node. Therefore, the sensor nodes need not manage information about another session for data transmission/reception.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling access to multiple channels including a control channel and N data channels, the apparatus comprising:
channel scanner scanning at least one or more available channels among the N data channels in a Tx sensor node;
a control channel preoccupier preoccupying, in the Tx sensor node, the control channel through control channel sensing and back-off and broadcasting a preamble on the control channel periodically; and
an available channel exchanger detecting, in an Rx sensor node, the available channels available to the Tx sensor node on the basis of the received preamble, selecting a channel available to the Rx sensor node among the detected available channels, and transmitting information about the selected channel to the Tx sensor node, and
wherein the time period (T.sub.CtrlSense) for the control channel sensing is the sum of the time period (T.sub.CCA) for determining whether there is non-noise data in a transceiver and the time period (T.sub.WaitAck) for waiting to receive an Ack message indicating the receipt of the preamble from the Rx sensor node.

2. An apparatus for controlling access to multiple channels including a control channel and N data channels, the apparatus comprising:
channel scanner scanning at least one or more available channels among the N data channels in a Tx sensor node;
a control channel preoccupier preoccupying, in the Tx sensor node, the control channel through control channel sensing and back-off and broadcasting a preamble on the control channel periodically; and
an available channel exchanger detecting, in an Rx sensor node, the available channels available to the Tx sensor node on the basis of the received preamble, selecting a channel available to the Rx sensor node among the detected available channels, and transmitting information about the selected channel to the Tx sensor node, and
wherein the time (T.sub.ChSense) taken for the channel scanner to scan one data channel is the sum of the time (SIFS) taken for the Tx sensor node/the Rx sensor node to change the mode of its transceiver from an Rx/Tx mode into a Tx/RX mode and the time (T.sub.CCA) taken to determine whether there is non-noise data in the transceiver.

3. A method of controlling access to multiple channels including a control channel and N data channels in a wireless sensor network system, the method comprising:
scanning at least one or more available channels among the N data channels, by a Tx sensor node;
preoccupying the control channel through control channel sensing and back-off and broadcasting a preamble on the control channel periodically, by the Tx sensor node; and detecting the available channels available to the Tx sensor node on the basis of the received preamble, selecting a channel available to the Rx sensor node among the detected available channels, and transmitting information about the selected channel to the Tx sensor node, by an Rx sensor node, and wherein the time period (T.sub.CtrlSense) for the control channel sensing is the sum of the time period (T.sub.CCA) for determining whether there is non-noise data in a transceiver and the time period (T.sub.WaitAck) for waiting to receive an Ack message indicating the receipt of the preamble from the Rx sensor node.

4. A method of controlling access to multiple channels including a control channel and N data channels in a wireless sensor network system, the method comprising:

scanning at least one or more available channels among the N data channels, by a Tx sensor node;

preoccupying the control channel through control channel sensing and back-off and broadcasting a preamble on the control channel periodically, by the Tx sensor node; and detecting the available channels available to the Tx sensor node on the basis of the received preamble, selecting a channel available to the Rx sensor node among the detected available channels, and transmitting information about the selected channel to the Tx sensor node, by an Rx sensor node, and wherein the time (T.sub.ChSense) taken to scan one data channel is the sum of the time (SIFS) taken for the Tx sensor node/the Rx sensor node to change the mode of its transceiver from an Rx/Tx mode into a Tx/RX mode and the time (T.sub.CCA) taken to determine whether there is non-noise data in the transceiver.

* * * * *